June 15, 1937.   F. GOLDIS   2,084,083
HATCHING IMPLEMENT
Filed March 3, 1936
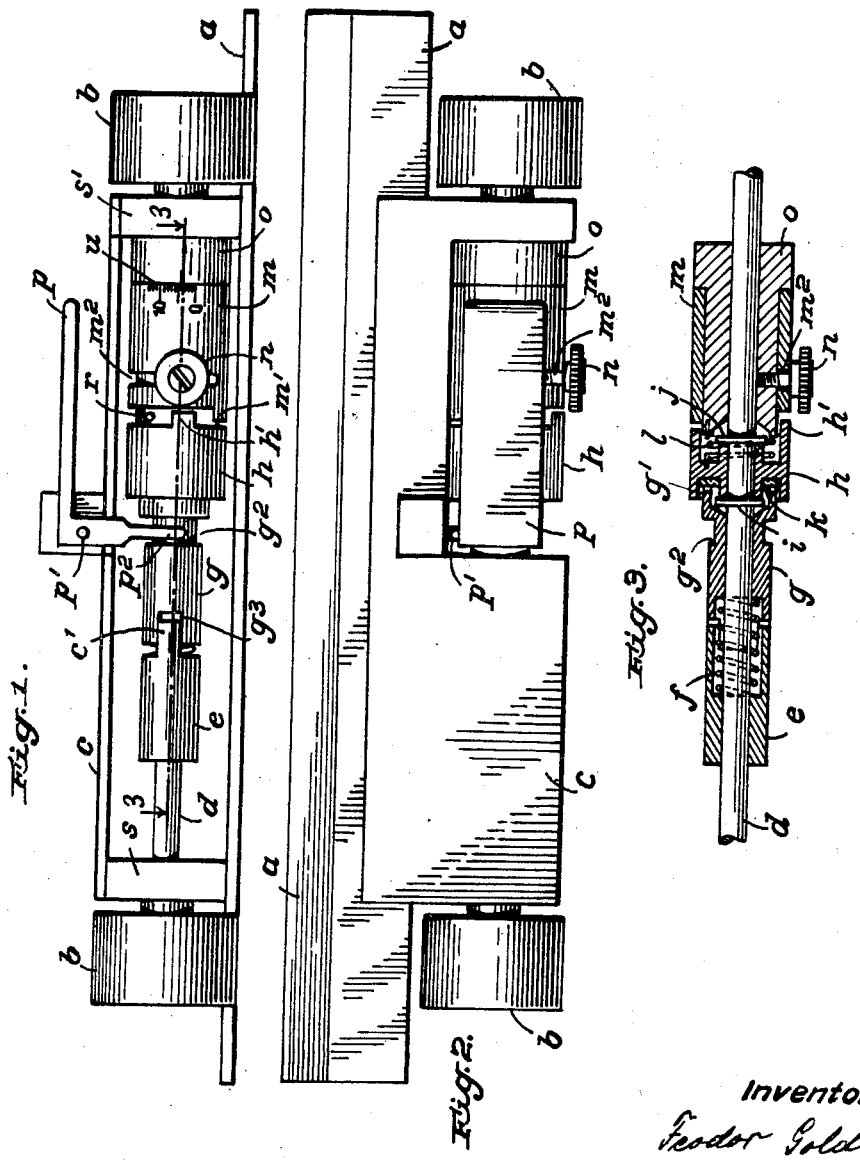

Patented June 15, 1937

2,084,083

UNITED STATES PATENT OFFICE 2,084,083

HATCHING IMPLEMENT

Feodor Goldis, Madrid, Spain

Application March 3, 1936, Serial No. 66,980
In Austria February 16, 1935

5 Claims. (Cl. 33—109)

This invention relates to a hatching implement running upon two rolls and being provided with means able to stop the shifting of the implement parallel to itself after a certain definite distance. The hatching implements known up to now are equipped with a cog-wheel secured to the axle of the rolls, and the stopping is effected by a pawl engaging the teeth of said cog-wheel. Hatching implements of this type suffer from the drawback that the hatching width cannot be adjusted at will, altering it is possible only in certain steps by exchanging the cog-wheel and the rolls which is, however, inconvenient.

These drawbacks are obviated, according to the present invention, by providing the hatching implement in combination with the means adapted to stop its shifting movement after a certain distance, with an adjusting device that renders it possible to vary the length of the way, at the end of which the stopping is to take place. The improved implement is, for said purpose, so designed that a rotary ring is arranged upon the axle of the rolls and can be turned, or re-adjusted respectively, between two abutment members rigidly connected with the implement, said ring being subjected to the action of a spring by which it is always moved back into its initial position; furthermore, a coupling is provided adapted to connect the roll axle with the said ring. When the implement is moved, the roll axle and the movable ring are connected with one another by the coupling, in consequence whereof motion is possible only until said ring contacts with one of the abutment members. Now the hatching line is drawn. Then the coupling members are disconnected for a short time so that the spring shifts the movable ring back into its initial position, and now the implement can be further moved for a distance of the same length. As the distance between the two abutment members can very easily be altered also the width of the hatching may be varied in a simple manner in any desired degree.

The invention is illustrated diagrammatically and by way of example on the accompanying drawing on which Figure 1 is a front-view of the implement, Figure 2 is a plan of the same, and Figure 3 is a horizontal section on line 3—3 through certain members located in the middle portion of the implement.

The implement is supported by the ruler $a$ and the rolls $b$, $b$ which latter in turn are mounted on a shaft $d$ journalled in the frame $s$, $c$, $s'$, the members $s$ and $s'$ of which are rigidly connected with said ruler. When the implement is shifted in a direction transverse to its longitudinal axis, the rolls rotate correspondingly, as does, therefore, also the shaft $d$. On the shaft $d$ a clutch is provided consisting of a member $e$ rigidly connected to the shaft and of a member $g$ axially shiftable thereon. At their neighbouring ends each of the coupling members is provided with a cavity, and into the two cavities a helical compression spring $f$ is inserted by which the coupling member $g$ is pressed against a rubber ring $k$ housed in an annular groove provided in a cylindrical member $h$ rotatably mounted on the shaft $d$. The parts $e$ and $g$ are coupled with each other by means of projections $e^1$ provided on the part $e$ and engaging grooves $g^3$ provided on the part $g$ in such a manner that the parts $e$ and $g$ may be moved axially but cannot be turned relatively to each other. The free end of the coupling member $g$ which engages said rubber ring is provided with frontal teeth $g'$. The coupling member $g$ and said cylindrical member $h$ constitute obviously a kind of coupling. The member $h$ is prevented from axial motion by collars $i$ and $j$ affixed to the shaft $d$. On the member $h$ an axial extension $h'$ is provided which can contact when the member $h$ rotates in the one direction with a pin $r$ projecting laterally from a cylindrical member $o$ firmly connected with the right-hand portion $s'$ of the frame, and when the member $h$ rotates in the other direction with a projection $m'$ of a sleeve $m$ rotatably arranged on said member $o$ and adapted to be secured in its angular position thereon by means of a screw $n$ engaging a slot $m^2$ of said sleeve $m$ and being screwed into the member $o$.

While the hatching is being carried out, the implement can be shifted until the projection $h'$ of the cylindrical member $h$ contacts with the projection $m'$ of the sleeve $m$.

Between the member $h$ and the member $o$ a helical compression spring $l$ is provided, the ends of which are fastened to said members respectively and which is subjected to tension when the implement is shifted in the above mentioned manner. A bell-crank lever $p$ is pivoted on the bolt $p^1$ supported in the member $c$ of the frame. The arm $p^2$ of the bell-crank lever engages a circumferential groove $g^2$ of the member $g$. By turning the lever $p$, $p^2$ in a clockwise direction the coupling member $g$ may be axially moved to the lefthand side (Fig. 1) so that the coupling member $g$, $h$ is uncoupled and the spring $l$ turns the member $h$ until its projection $h'$ contacts with the pin $r$ of the member $o$.

When the lever $p$ is released, the spring $f$ moves the member $g$ again into engagement with the member $h$ and the implement can again be shifted for a certain distance. The amount of the rotary movement of the sleeve $h$ relatively to the cylindrical member $o$ is decisive for the shifting movement of the implement and, therefore, also for the width between the hatching lines. This amount can be adjusted by an adjustment of the sleeve $m$ relatively to the member $o$ by means of the screw and slot connection $m^2$, $n$. The width between the hatching lines can be read at the graduated scale $u$ coacting with a mark on the member $o$ as shown near the right-hand end of Fig. 1. The coupling parts $e$ and $g$ remain in engagement with each other at each position of the part $g$.

I claim:—

1. A hatching implement comprising, in combination with a frame, two rolls upon which the implement runs, a shaft journalled in said frame and having said rolls affixed to it, a rotary member on said shaft, abutment members connected with the frame and limiting the rotary movement of said rotary member in both directions, a spring connected with the said rotary member and a fixed part of the implement respectively and being adapted to turn the said member back into its initial position after each actuation, and a coupling located upon the said shaft and adapted to establish a connection of the latter with the said rotary member.

2. A hatching implement comprising, in combination with a frame, two rolls upon which the implement runs, a shaft journalled in said frame and having said rolls affixed to it, a frame supporting said shaft, a rotary member supported by the said shaft, a lateral projection on said member, another member also supported on said shaft opposite said projection and connected with said frame, an abutment on said other member, a rotary sleeve adjustable on and relatively to the said other member having another abutment, said abutments being adapted to be engaged by said projection, and means adapted to secure said sleeve with its abutment in any adjusted position on the second member so as to vary the distance between the two abutments.

3. A hatching implement comprising, in combination with a frame, two rolls upon which the implement runs, a shaft journalled in said frame and having said rolls affixed to it, a frame supporting said shaft, a rotary member supported by the said shaft, a lateral projection on said member, another member also supported on said shaft opposite said projection and connected with said frame, an abutment on said other member, a rotary sleeve adjustable on and relatively to the said other member having another abutment, said abutments being adapted to be engaged by said projection, and means adapted to secure said sleeve with its abutment in any adjusted position on the second member so as to vary the distance between the two abutments, said sleeve having a graduated scale and co-acting with a mark on said other member.

4. A hatching implement comprising, in combination with a frame, two rolls upon which the implement runs, a shaft journalled in said frame and having said rolls affixed to it, a rotary member on said shaft, abutment members connected with the frame and limiting the rotary movement of said rotary member in both directions, a spring connected with the said rotary member and a fixed part of the implement respectively and being adapted to turn the said member back into its initial position after each actuation and a coupling, one part of which comprises a member fixed to said shaft and a member axially shiftable thereon and being in engagement with the fixed member at each of its positions, and the other of which comprises a rubber ring secured to said rotary member opposite the shiftable coupling member, and a frontal toothing at the shiftable coupling member opposite said rubber ring.

5. A hatching implement comprising, in combination with a frame, two rolls upon which the implement runs, a rotatable member journalled in said frame to which the rolls are affixed, two abutments connected with the frame, the one being adjustable and the other stationary, the distance between the abutments limiting the rotary movement of the said rotatable member, a spring connected with the said rotatable member and the frame respectively and a coupling adapted to establish a connection between said rotatable member and said rolls.

FEODOR GOLDIS.